US007056967B2

(12) United States Patent
Voigt et al.

(10) Patent No.: US 7,056,967 B2
(45) Date of Patent: Jun. 6, 2006

(54) STABILIZED MEDIUM AND HIGH VOLTAGE CABLE INSULATION COMPOSITION

(75) Inventors: Wolfgang Voigt, Lörrach (DE); John Kenny, Reinach (CH)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 326 days.

(21) Appl. No.: 10/117,650

(22) Filed: Apr. 5, 2002

(65) Prior Publication Data

US 2002/0198344 A1 Dec. 26, 2002

(30) Foreign Application Priority Data

Apr. 10, 2001 (EP) .................................. 01810356
May 23, 2001 (EP) .................................. 01810511

(51) Int. Cl.
*C08J 3/20* (2006.01)
*C08J 3/24* (2006.01)
*C08K 5/13* (2006.01)

(52) U.S. Cl. ...................... 524/331; 524/326; 524/570

(58) Field of Classification Search ................ 524/326, 524/331, 570

See application file for complete search history.

(56) References Cited

U.S. PATENT DOCUMENTS

| | | | | |
|---|---|---|---|---|
| 4,759,862 A | | 7/1988 | Meier | 252/47.5 |
| 4,857,572 A | * | 8/1989 | Meier et al. | 524/289 |
| 5,008,459 A | * | 4/1991 | Meier et al. | 568/46 |
| 5,091,099 A | * | 2/1992 | Evans et al. | 508/478 |
| 6,143,822 A | | 11/2000 | Caronia et al. | 524/849 |
| 6,191,230 B1 | | 2/2001 | Keogh et al. | 525/263 |

FOREIGN PATENT DOCUMENTS

| | | | |
|---|---|---|---|
| EP | 0966000 | * | 12/1999 |
| EP | 1 036 805 | | 9/2000 |
| EP | 1036804 | * | 9/2000 |
| EP | 1 041 583 | | 10/2000 |
| EP | 1 088 851 | | 4/2001 |
| WO | 95/25767 | | 9/1995 |

OTHER PUBLICATIONS

Chem. Abstr. 133:336221 for JP 2000306433 (Nov. 2000).
R. C. Weast, CRC Handbook of Chemistry and Physics, $64^{th}$ Ed. p. C-295, 1983-1984.

* cited by examiner

*Primary Examiner*—Ana Woodward
(74) *Attorney, Agent, or Firm*—Joseph C. Suhadolnik

(57) ABSTRACT

The invention relates to a polyethylene composition for use as insulation for wire and cable that has improved scorch resistance comprising
(a) a polyethylene
(b) a scorch inhibitor having a melting point below 50° C. at atmospheric pressure, and
(c) an organic peroxide.

7 Claims, No Drawings

STABILIZED MEDIUM AND HIGH VOLTAGE CABLE INSULATION COMPOSITION

STABILIZED MEDIUM AND HIGH VOLTAGE CABLE INSULATION COMPOSITION

The invention relates to a polyethylene composition for use as insulation for wire and cable that has improved scorch resistance. The stabilized composition is suitable for use as cable insulation of medium and high voltage power cables.

Insulation compositions generally include a polyethylene, a peroxide crosslinking agent and a stabilizer. Polymers containing peroxides are vulnerable to scorch, i.e. to premature crosslinking occurring during the extrusion process.

There are several key factors which must be considered when making the choice of an appropriate stabilizing system. These factors include the crosslinking speed and the degree of crosslinking, resistance to scorch at extrusion temperatures, efficient retention of mechanical properties before and after high temperature aging, no exudation to the polymer surface and a high degree of cleanliness.

U.S. Pat. No. 6,191,230 described a polyethylene composition containing as scorch inhibitor a substituted hydroquinone, 4,4'-thiobis(2-methyl-6-tert.-butylphenol); 4,4'-thiobis(2-tert.-butyl-5-methylphenol); or mixtures thereof.

In order to remove electroconductive impurities the European Patent Application EP-A-613154 describes a process to prepare a polyethylene composition whereby the crosslinking agent and/or the stabilizer are blended into a low density polyethylene after being subjected to a purification process.

Cleanliness is a critical parameter and there is still a need to provide clean insulating material containing polyethylene crosslinkable compositions which can be extruded with a minimum of premature crosslinking and yet showing a sufficient crosslinking speed.

It has now been found that an improved insulation material can be obtained by using a liquid stabilizing system.

Thus, the invention relates to a composition comprising (a) a polyethylene (b) a scorch inhibitor having a melting point below 50° C. at atmospheric pressure, and (c) an organic peroxide.

Scorch inhibitors having a melting point below 50° C. at atmospheric pressure are e.g. phenols as described in U.S. Pat. No. 4,759, 862and U.S. Pat. No. 4,857,572, phenols as described in U.S. Pat. No. 5,008,459 or mixtures of said phenols; mixtures containing an aromatic amine and a phenol as described in U.S. Pat. No. 5,091,099. The term "scorch inhibitor" also includes mixtures as described in U.S. Pat. No. 5,091,099 containing in addition a phenol as described in U.S. Pat. No. 4,759, 862, U.S. Pat. No. 4,857, 572 or U.S. Pat. No. 5,008,459.

Referring to U.S. Pat. No. 4,759, 862 and U.S. Pat. No. 4,857,572 the scorch inhibitor is a compound of formula

I

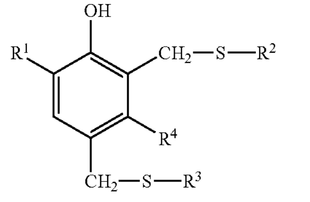

wherein $R^1$ is $C_{1-20}$alkyl or $C_{1-20}$alkyl which is substituted by phenyl, $C_{2-20}$alkenyl, $C_{3-20}$alkinyl, $C_{5-9}$cycloalkyl, phenyl or tolyl;

$R^2$ and $R^3$ each independently of the other are:

$C_{1-29}$alkyl or $C_{1-20}$alkyl which is substituted by the following radicals: phenyl, one or two hydroxyl, cyano, formyl, acetyl, —O—$COR^5$; $R^5$ is $C_{1-20}$alkyl; $C_{2-20}$alkenyl or $C_{3-20}$alkinyl; $C_{5-7}$cycloalkyl or $C_{5-7}$cycloalkyl which is substituted by hydroxyl; phenyl, 4-chlorophenyl, 2-methoxycarbonylphenyl, p-tolyl, 1,3-benzthiazol-2-yl, or $—(CHR^6)_n$ $COOR^7$ or $—(CHR^6)_nCONR^8R^9$ with n is 1 or 2, $R^6$ is hydrogen or $C_{1-6}$alkyl, $R^7$ is $C_{1-20}$alkyl, $C_{1-20}$alkyl which is interrupted by one to five O or S, $C_{5-7}$cycloalkyl, phenyl, benzyl, tolyl, $R^8$ and $R^9$ are hydrogen or $C_{1-6}$alkyl;

$R^4$ is hydrogen or methyl.

$C_{1-20}$alkyl radicals are, for example, methyl, ethyl, n-propyl, isopropyl, n-butyl, sec.-butyl, tert.-butyl, n-pentyl, isopentyl, n-hexyl, n-heptyl, 1,1-dimethylbutyl, n-octyl, 2-ethylhexyl, isooctyl (isomeric mixture of primary octyl), n-nonyl, tert.-nonyl (isomeric mixture), n-decyl, 1,1,3,3-tetramethylbutyl (t-octyl), n-dodecyl, tert.-dodecyl (mixture containing as main component 1,1,3,3,5,5-hexamethylhexyl and 1,1,4,6,6-pentamethylhept-4-yl), n-tetradecyl, n-hexadecyl, n-octadecyl or n-eicosyl.

$C_{2-20}$alkenyl radicals are, for example, vinyl, allyl (prop-2-enyl), but-3-enyl, pent-4-enyl, hex-5-enyl, oct-7-enyl, dec-9-enyl or dodec-11-enyl. Allyl is preferred.

$C_{3-20}$alkinyl radicals are, for example, propargyl, but-3-inyl, hex-5-inyl, oct-7-inyl, dec-9-inyl, dodec-11-inyl, tetradec-13-inyl, hexadec-15-inyl, octadec-17-inyl or eicos-19-inyl. Propargyl is preferred.

$C_{5-9}$cycloalkyl radicals are, for example, cyclopentyl, cyclohexyl, cycloheptyl, cyclooctyl, cyclononyl, and in particular cyclohexyl.

$C_{1-20}$alkyl radicals substituted by phenyl are, for example, benzyl, phenethyl, α-methylbenzyl, α,α-dimethylbenzyl, phenylbutyl, phenyl-α,α-dimethylpropyl, phenylhexyl, phenyl-α,α-dimethyl-butyl, phenylbutyl or phenyl-α,α-dimethylhexyl. Benzyl, α-methylbenzyl and α,α-dimethylbenzyl are preferred.

$C_{1-20}$alkyl radicals substituted by one or two hydroxyl groups are, for example, 2-hydroxyethyl, 2-hydroxypropyl, 2-hydroxybutyl, 2-hydroxyhexyl, 2-hydroxyoctyl, 2-hydroxydecyl, 2-hydroxydodecyl, 2-hydroxytetradecyl, 2-hydroxyhexadecyl, 2-hydroxyoctadecyl, 2-hydroxy-eicosyl or 2,3-dihydroxypropyl. Preferred is 2-hydroxyethyl, 2-hydroxypropyl and 2,3-dihydroxypropyl.

$C_{1-20}$alkyl radicals substituted by phenyl and hydroxy are, for ex. 1-phenyl-2-hydroxyethyl.

$C_{1-20}$alkyl radicals substituted by cyano are, for example, 2-cyanoethyl.

$C_{1-20}$alkyl interrupted by one to five O or S are, for example, 3-oxapropyl, 3-thiapropyl, 3-oxabutyl, 3-thiabutyl, 3-oxapentyl, 3-thiapentyl, 3,6-dioxaheptyl, 3,6,9-trioxadecyl or 3,6,9,12,15,18 hexaoxanonadecyl.

The group $R^1$ is preferably $C_{1-20}$alkyl, more preferably methyl or tert.-butyl, most preferably methyl and the groups $R^2$ and $R^3$ are preferably identical and are $C_{1-20}$alkyl or $C_{1-20}$alkyl substituted by one or two hydroxyl, preferably $C_{8-14}$alkyl, and in particular n-octyl, tert.-nonyl, n-dodecyl or tert.-dodecyl, 2-hydroxyethyl or 2,3-dihydroxypropyl.

The substances listed below may be regarded as examples of representatives of compounds of the formula 1:

a) Compounds of formula I with $R^1$=alkyl (methyl, tert.-butyl, isopropyl, 2-ethylhexyl, 1,1-dimethylpropyl or 1,1-dimethylbutyl)

2,4-bis(2'-hydroxyethylthiomethyl)-6-methylphenol, 2,4-bis(2',3'-dihydroxypropylthiomethyl)-3,6-dimethylphenol, 2,4-bis(2'-acetyloxyethylthiomethyl)-3,6-dimethylphenol, 2,4-bis(2'-n-decanoyloxyethylthiomethyl)-6-methylphenol, 2,4-bis(n-octylthiomethyl)-6-methylphenol, 2,4-bis(n-dodecylthiomethyl)-6-methylphenol, 2,4-bis(tert.-dodecylthiomethyl)-6-methylphenol, 2,4-bis(benzylthiomethyl)-6-methylphenol, 2,4-bis(2'-ethylhexyloxycarbonylmethylthiomethyl)-6-methylphenol, 2,4-bis(n-octadecyloxycarbonylmethylthiomethyl)-3,6-dimethylphenol, 2,4-bis(methylthiomethyl)-6-tert.-butylphenol, 2,4-bis-(ethylthiomethyl)-6-tert.-butylphenol, 2,4-bis-(n-propylthiomethyl)-6-tert. butylphenol, 2,4-bis-(n-butylthiomethyl)-6-tert.-butylphenol, 2,4-bis-(n-hexylthiomethyl)-6-tert.-butylphenol, 2,4-bis-(n-octylthiomethyl)-6-tert.-butylphenol, 2,4-bis-(n-decylthiomethyl)-6-tert.-butylphenol, 2,4-bis-(n-dodecylthiomethyl)-6-tert.-butylphenol, 2,4-bis-(n-tetradecylthiomethyl)-6-tert.-butylphenol, 2,4-bis-(n-hexadecylthiomethyl)-6-tert.-butylphenol, 2,4-bis-(n-octadecylthiomethyl)-6-tert.-butylphenol, 2,4-bis-(n-eicosylthiomethyl)-6-tert.-butylphenol, 2,4-bis-(isopropylthiomethyl)-6-tert.-butylphenol, 2,4-bis-(sec.-butylthiomethyl)-6-tert.-butylphenol, 2,4-bis-(tert.-butylthiomethyl)-6-tert.-butylphenol, 2,4-bis-(2-ethylhexylthiomethyl)-6-tert.-butylphenol, 2,4-bis-(1,1,3,3-tetramethylbutylthiomethyl)-6-tert.-butylphenol, 2,4-bis-(1,1,3,3,5,5-hexamethylhexylthiomethyl)-6-tert.-butylphenol, 2,4-bis-[4-(2,2,4,6,6-pentamethylheptyl)-thiomethyt]-6-tert.-butylphenol, 2,4-bis-(prop-2-enylthiomethyl)-6-tert.-butylphenol, 2,4-bis-(prop-2-inylthiomethyl)-6-tert.-butylphenol, 2,4-bis-(cyclohexylthiomethyl)-6-tert.-butylphenol, 2,4-bis-(2-hydroxycyclohexylthiomethyl)-6-tert.-butylphenol, 2,4-bis-(phenylthiomethyl)-6-tert.-butylphenol, 2,4-bis(phenylthiomethyl)-3-methyl-6-tert.-butylphenol, 2,4-bis-(benzylthiomethyl)-6-tert.-butylphenol, 2,4-bis-(p-tolylthiomethyl)-6-tert.-butylphenol, 2,4-bis[2'-(2"-ethylhexcyloxycarbonyl) ethylthiomethyl]-3-methyl-6-tert.-butyl phenol, the dimethyl ester of 2,4-bis-(3-carboxy-2-thiapropyl)-6-tert.-butylphenol, the dibutyl ester of 2,4-bis-(3-carboxy-2-thiapropyl)-6-tert.-butylphenol, the dioctyl ester of 2,4-bis-(3-carboxy-2-thiapropyl)-6-tert.-butylphenol, the didodecyl ester of 2,4-bis-(3-carboxy-2-thiapropyl)-6-tert.-butylphenol, the monomethyl ester of 2,4-bis-(3-carboxy-2-thiapropyl)-6-tert.-butylphenol, the dimethyl ester of 2,4-bis-(4-carboxy-2-thiabutyl)-6-tert.-butylphenol, the dioctyl ester of 2,4-bis-(4-carboxy-2-thiabutyl)-6-tert.-butylphenol, the di-(2-ethylhexyl) ester of 2,4-bis-(3-carboxy-2-thiapropyl)-6-tert.-butylphenol, the dimethyl ester of 2,4-bis-(3-carboxy-2-thiabutyl)-6-tert.-butylphenol, the dimethyl ester of 2,4-bis-(4-carboxy-3-methyl-2-thiapentyl)-6-tert.-butylphenol the N,N-dimethylamide of 2,4-bis-(3-carboxy-2-thiapropyl)-6-tert.-butylphenol, the N,N-dihexylamide of 2,4-bis-(3-carboxy-2-thiapropyl)-6-tert.-butylphenol, the N,N-didodecylamide of 2,4-bis-(3-carboxy-2-thiapropyl)-6-tert.-butylphenol, the N,N-dimethylamide of 2,4-bis-(4-carboxy-2-thiabutyl)-6-tert.-butylphenol, the N,N-dimethylamide of 2,4-bis-[3-carboxy-2-thiabutyl]-6-tert.-butylphenol, the N,N-dibutylamide of 2,4-bis-(4-carboxy-3-methyl-2-thiapentyl)-6 tert.-butylphenol, the dicyclohexyl ester of 2,4-bis-(3-carboxy-2-thiapropyl)-6-tert.-butylphenol, the diphenyl ester of 2,4-bis-(3-carboxy-2-thiapropyl)-6-tert.-butylphenol, the dibenzyl ester of 2,4-bis-(3-carboxy-2-thiapropyl)-6-tert.-butylphenol, the di-p-tolyl ester of 2,4-bis-(3-carboxy-2-thiapropyl)-6-tert -butylphenol, the di-(3-thiabutyl) ester of 2,4-bis-(3-carboxy-2-thiapropyl)-6-tert.-butylphenol, the di-(3-oxabutyl) ester of 2,4-bis-(3-carboxy-2-thiapropyl)-6-tert.-butylphenol, the di-(N,N-dimethylamino-2-ethyl) ester of 2,4-bis-(3-carboxy-2-thiapropyl)-6-tert.-butylphenol, the diamide of 2,4-bis-(3-carboxy-2-thiapropyl)-6-tert.-butylphenol, the diamide of 2,4-bis-(4-carboxy-2-thiabutyl)-6-tert.-butylphenol, 2,4-bis-(prop-2-enylthiomethyl)-6-tert.-butylphenol, 2,4-bis-(prop-2-inylthiomethyl)-6-tert.-butylphenol, 2,4-bis-[2-hydroxyethylthiomethyl]-6-tert.-butylphenol, 2,4-bis-[2-cyanoethylthiomethyl]-6-tert.-butylphenol, 2,4-bis-[(4-methoxyphenyl)-thiomethyl]-6-tert.-butylphenol, 2,4-bis-[(4-chlorophenyl)-thiomethyl]-6-tert.-butylphenol, 2,4-bis-[(2-methoxycarbonylphenyl)-thiomethyl]-6-tert.-butylphenol, 2,4-bis-[(1,3-benzthiazol-2-yl)-thiomethyl]-6-tert.-butylphenol, 2,4-bis-[2,3-dihydroxypropylthiomethyl]-6-tert.-butylphenol, 2,4-bis-[(3,5-di-tert.-butyl-4-hydroxyphenyl)thiomethyl]-6-tert.-butylphenol, 2,4-bis-[4-(3,5-di-tert.-butyl-4-hydroxyphenyl)-2-thiabutyl]-6-tert.-butyl phenol, 2,4-bis-[4-acetoxy-2-thiabutyl]-6-tert.-butylphenol, 2,4-bis-[3-formyl-2-thiabutyl]-6-tert.-butylphenol and 2,4-bis-[3-acetyl-2-thiabutyl]-6-tert.-butylphenol.

2,4-bis-(n-octylthiomethyl)-6-isopropylphenol, 2,4-bis-(n-dodecylthiomethyl)-6-isopropylphenol, 2,4-bis-(n-octylthiomethyl)-6-(2-ethylhexyl)-phenol, 2,4-bis-(n-dodecylthiomethyl)-6-(2-ethylhexyl)-phenol, 2,4-bis-(n-dodecylthiomethyl)-6-(1,1-dimethylpropyl)-phenol, 2,4-bis-(n-octylthiomethyl)-6-(1,1-dimethylbutyl)-phenol, 2,4-bis-(n-dodecylthiomethyl)-6-(1,1-dimethylbutyl)-phenol, b) compounds of formula I with $R^1$=cycloalkyl (cyclohexyl)

2,4-bis-(n-octylthiomethyl)-6-cyclohexylphenol, 2,4-bis-(n-dodecylthiomethyl)-6-cyclohexylphenol.

c) compounds of formula I with $R^1$=phenyl or tolyl 2,4-bis-(n-octylthiomethyl)-6-phenylphenol, 2,4-bis-(n-dodecylthiomethyl)-6-phenylphenol, 2,4-bis-(n-octylthiomethyl)-6-p-tolylphenol, 2,4-bis-(n-dodecylthiomethyl)-6-p-tolylphenol.

d) compounds of formula I with $R^1$=alkyl substituted by phenyl (benzyl, α,α-dimethylbenzyl)

2,4-bis-(n-octylthiomethyl)-6-benzyl phenol, 2,4-bis-(n-dodecylthiomethyl)-6-benzylphenol, 2,4-bis-(n-dodecylthiomethyl)-6-(α,α-dimethylbenzyl)-phenol.

e) compounds of formula I with $R^1$=alkenyl (prop-2-enyl) or alkinyl (prop-2-inyl)

2,4-bis-(n-octylthiomethyl)-6-prop-2-enylphenol, 2,4-bis-(n-dodecylthiomethyl)-6-prop-2-enylphenol. 2,4-bis-(n-dodecylthiomethyl)-6-prop-2-inylphenol.

Especially suitable are those compounds of the formula I disclosed in U.S. Pat. No. 4,857,572, wherein

| $R^1$ | $R^2$ and $R^3$ | $R^4$ | mp ° C. |
|---|---|---|---|
| methyl | n-octyl | hydrogen | <20 |
| methyl | n-octyl | methyl | <20 |
| methyl | n-dodecyl | hydrogen | 28 |
| methyl | n-dodecyl | methyl | 43 |
| t-butyl | n-dodecyl | methyl | 40 |
| methyl | benzyl | hydrogen | <20 |
| methyl | $—CH_2COOR^7$ with $R^7$ = 2-ethylhexyl. | hydrogen | <20 |
| methyl | $—CH_2CH_2OH$ | hydrogen | <20 |
| methyl | $—C(CH_3)_2—CH_2—C(CH_3)_2—CH_2—C(CH_3)_3$ | hydrogen | <20 |
| methyl | $—C(CH_3)_2—CH_2—C(CH_3)_3$ | hydrogen | <20 |

or compounds of the formula I disclosed in U.S. Pat. No. 4,759,862, wherein

| $R^1$ | $R^2$ and $R^3$ | $R^4$ | mp ° C. |
|---|---|---|---|
| tert.-butyl | 2-ethylhexyl | hydrogen | <20 |
| tert.-butyl | n-octyl | hydrogen | <20 |
| tert.-butyl | n-dodecyl | hydrogen | <20 |
| tert.-butyl | $—CH_2COOR^7$ with $R^7$ = 2-ethylhexyl. | hydrogen | <20 |
| phenyl | $—CH_2COOR^7$ with $R^7$ = 2-ethylhexyl. | methyl | <20 |
| tert.-butyl | tert.-$C_8H_{17}$— | hydrogen | <20 |
| tert.-butyl | tert.-$C_9H_{19}$— | hydrogen | <20 |
| tert.-butyl | $—CH_2CH_2OH$ | hydrogen | <20 |
| tert.-butyl | $—CH_2CH(OH)CH_2OH$ | hydrogen | <20 |

The most preferred liquid scorch inhibitor of formula I is 2,4-bis(n-octylthiomethyl)-6-methylphenol and 2,4-bis(n-dodecylthiomethyl)-6-methylphenol.

With reference to U.S. Pat. No. 5,008,459 the scorch inhibitor is a compound of the formula II or III or mixtures thereof

II

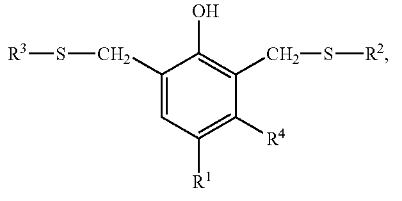

-continued

III

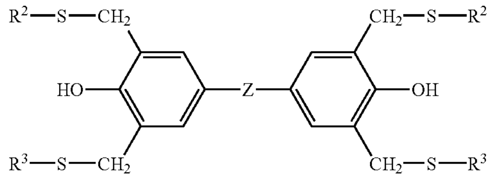

wherein $R^1$, $R^2$, $R^3$ and $R^4$ are as defined above; and Z is —S—, $—CH_2—$, $—CH(CH_3)—$ or $—C(CH_3)_2—$.

The substances listed below may be regarded as examples of representatives of compounds of the formula II:

2,6-bis-(2'-hydroxyethylthiomethyl)-4-methylphenol, 2,6-bis-(2',3'-dihydroxypropylthiomethyl)-4-methylphenol, 2,6-bis-(2'-methylaminocarbonylethylthiomethyl)-4-phenylphenol, 2,6-bis-(N,N-diethylaminocarbonyl-ethylthiomethyl)-4-allylphenol, 2,6-bis-(n-octylthiomethyl)-4-methylphenol, 2,6-bis-(n-dodecylthiomethyl)-4-methylphenol 2,6-bis-(n-octylthiomethyl)-4-tert.-butylphenol, 2,6-bis-(n-dodecylthiomethyl)-4-tert.-butylphenol, 2,6-bis-(n-octylthiomethyl)-4-(1',1',3',3'tetramethylbutyl)phenol, 2,6-bis-(t-nonylthiomethyl)-4-tert.-butylphenol, 2,6-bis-(t-dodecylthiomethyl)-4-tert.-octyl-phenol, 2,6-bis-(benzylthiomethyl)-6-methylphenol, 2,6-bis-(phenylthiomethyl)-4-tert.-butyl-phenol, 2,6-bis-(2'-ethylhexyloxycarbonylmethyl-thiomethyl)-4-cyclohexylphenol, 2,6-bis-(2'-isooctyloxycarbonylmethyl-thiomethyl)-4-cyclohexylphenol, 2,6-bis-(n-octadecyloxycarbonylmethyl-thiomethyl)-4-propargylphenol, 2,6-bis-[2'-(2"-ethylhexyloxycarbonyl)-ethylthiomethyl]-4-tert.-butylphenol.

The substances listed below may be regarded as examples of representatives of compounds of the formula III:

2,2-bis-[4',4"-dihydroxy-3',3",5',5"-tetrakis-(n-octylthiomethyl)-phenyl]-propane, 2,2-bis-[4',4"-dihydroxy-3',3",5',5"-tetrakis-(n-dodecylthiomethyl)-phenyl]-propane, bis-[4,4'-dihydroxy-3,3',5,5'-tetrakis-(n-octylthiomethyl)-phenyl]-methane, bis-[4,4'-dihydroxy-3,3',5,5'-tetrakis-(n-dodecylthiomethyl)-phenyl]-methane, 2,2-bis-[4',4"-dihydroxy-3',3",5',5"-tetrakis-(2-ethylhexyloxycarbonyl-methylthiomethyl)-phenyl]propane, 2,2-bis-[4',4"-dihydroxy-3',3",5',5"-tetrakis-(2-isooctyloxycarbonyl-methylthiomethyl)-phenyl]propane.

With reference to U.S. Pat. No. 5,091,099 the scorch inhibitor is a mixture containing an amine selected from diphenylamine, 4-tert.-butyldiphenylamine, 4-tert.-octyl-diphenylamine, 4,4'-di-tert.-butyldiphenylamine, 2,4,4'-tris-tert.-butyldiphenylamine, 4-tert.-butyl-4'-tert.-octyldiphenylamine, o,o'-, m,m'- or p,p'-di-tert.-octyldiphenylamine, 2,4-di-tert.-butyl-4'-tert.-octyldiphenylamine, 4,4'-di-tert.-octyldiphenylamine, 2,4-di-tert.-octyl-4'-tert.-butyldiphenylamine, and in addition a phenol according to formula I, II, or III above or a phenol selected from the following phenols:

Phenol P

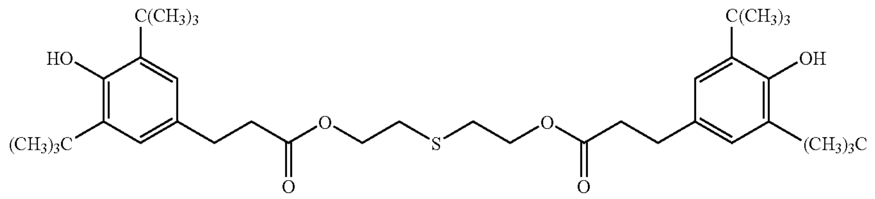

Phenol W

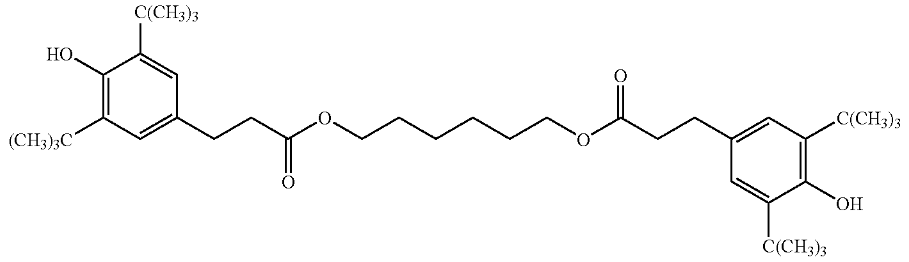

Phenol S

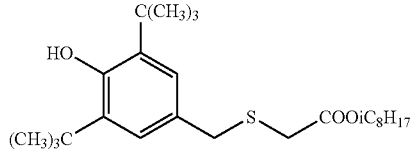

Phenol X

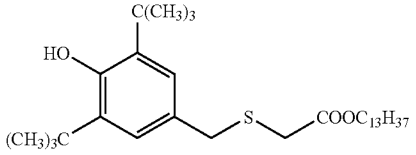

Phenol U

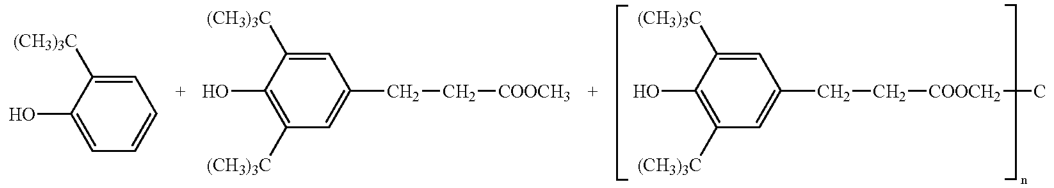

30 wt % 30 wt % 40 wt % n = 4

Phenol V

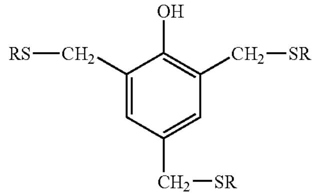

R = $CH_2COOC_8H_{17}$

The amounts of the aromatic amines in the mixture are:

not more than 5% by weight of diphenylamine (a),

8–15% by weight of 4-tert.-dibutyl-diphenylamine (b), 24 to 32% by weight of compounds selected from group (c),
- (c)(i) 4-tert.-octyldiphenylamine
- (c)(ii) 4,4'-di-tert.-butyldiphenylamine
- (c)(iii) 2,4,4'-tris-tert.-butyldiphenylamine 23 to 34% by weight of compounds selected from group (d),
- (d)(i) 4-tert.-butyl-4'-tert.-octyldiphenylamine
- (d)(ii) o,o'-, m,m'- or p,p'-di-tert.-octyldiphenylamine
- (d)(iii) 2,4-di-tert.-butyl-4'-tert.-octyldiphenylamine; and 21 to 34% by weight of compounds selected from group (e)
- (e)(i) 4,4'-di-tert.-octyldiphenylamine
- (e)(ii) 2,4-di-tert.-octyl-4'-tert.-butyldiphenylamine, based in each case on the total amount of amines.

A preferred amine is 4,4'-di-tert.-octyldiphenylamine or Amine (A) which is a mixture of 3 wt % diphenylamine, 14 wt % 4-tert.-butyldiphenylamine, 30 wt % (4-tert.-octyldiphenylamine 4,4'-di-tert.-butyldiphenylamine and 2,4,4'-tris-tert.-butyldiphenylamine), 29 wt % (4-tert.-butyl-4'-tert.-octyldiphenylamine, o,o', m,m' or p,p'-di-tert.-octyldiphenylamine and 2,4-di-tert.-butyl-4'-tert.-octyldiphenylamine), 18 wt % 4,4'-di-tert.-octyldiphenylamine and 6 wt % 2,4-di-tert.-octyl-4'-tert.-butyldiphenylamine.

Examples of mixtures suitable as scorch inhibitor are:

Amine (A) and Phenol (P)

4,4'-di-tert.-octyldiphenylamine and Phenol (P)

4,4'-di-tert.-octyldiphenylamine and Phenol (S)

Amine (A) and Phenol (U)

Amine (A) and Phenol (V)

Amine (A) and Phenol (W)

Amine (A) and Phenol (X)

The weight ratio of amine to Phenol is 4 to 5:1.

Especially suitable as liquid scorch inhibitor is a mixture of 80 wt % 4,4'-di-tert.-octyldiphenylamine and 20 wt % of Phenol P.

The compounds of the formulae I, II and III are prepared by processes which are known per se and described in U.S. Pat. No. 4,759, 862 and U.S. Pat. No. 4,857,572 (formula I) or in U.S. Pat. No. 5,008,459 (formula II and III).

Polyethylene, as that term is used herein, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture or blend of such homopolymers and copolymers. The mixture can be a mechanical blend or an in situ blend. Examples of the alpha-olefins are propylene, 1-butene, 1-hexane, 4-methyl-1-pentene, and 1-octene. The polyethylene can also be a copolymer of ethylene and an unsaturated ester such as a vinyl ester, e.g., vinyl acetate or an acrylic or methacrylic acid ester.

Suitable polyethylenes are so-called high pressure polyethylenes. A variety of such polymers are commercially available. The high pressure polyethylenes are preferably homopolymers of ethylene having a density in the range of 0.910 to 0.930 g/cm$^3$. The homopolymer can also have a melt index in the range of about 1 to about 5 g per 10 minutes, and preferably has a melt index in the range of about 0.75 to about 3 g per 10 minutes. Melt index is determined under ASTM D-1238.

The crosslinking agent is an organic peroxide including dialkyl peroxides such as dicumyl peroxide, di -tert.-butyl peroxide, tert.-butyl cumyl peroxide, 2,5-dimethyl-2,5-di(t-butylperoxy)-hexane, 2,5-dimethyl-2,5-di(t-amylperoxy)-hexane; 2,5-dimethyl-2,5-di(t-butylperoxy) hexane-3, 2,5-dimethyl-2,5-di(t-amylperoxy)hexyne-3, α,α-di[(t-butylperoxy)-isopropyl]-benzene, di-tert.-amyl peroxide, 1,3,5-tri-[(t-butylperoxy)-isopropyl]benzene, 1,3-dimethyl-3-(t-butylperoxy)butanol, 1,3-dimethyl-3-.(t-amylperoxy) butanol and mixtures thereof. Other suitable organic peroxides are: succinic acid peroxide, benzoyl peroxide, tert.-butyl peroxy-2-ethyl hexanoate, p-chlorobenzoyl peroxide, tert.-butyl peroxy isobutylate, tert.-butyl peroxy isopropyl carbonate, tert.-butyl peroxy laurate, 2,5-dimethyl-2,5-di (benzoyl peroxy)-hexane, tert.-butyl peroxy acetate, di-tert.-butyl diperoxy phthalate, tert.-butyl peroxy maleic acid, cyclohexanone peroxide, tert.-butyl peroxy benzoate. Preferred are dialkylperoxides.

The organic peroxides have a decomposition temperature in the range of 100 to 200°C. Especially preferred is dicumyl peroxide, having a decomposition temperature of 150°C.

The organic peroxide and the scorch inhibitor are incorporated into the polyethylene by known methods, for example by melt blending in a roll mill, a kneading extruder or a mixer at a temperature lower than the decomposition temperature of the peroxide or by a soaking method whereby the liquid scorch inhibitor/peroxide blend is mixed until the whole liquid phase is soaked into the polymer.

The scorch inhibitor and/or the peroxide can be added to the polyethylene either before or during processing.

The amount of the scorch inhibitor is in the range from 0.01 to 1 wt %, preferably 0.1 to 0.5 wt %.

The amount of the peroxide is in the range from 0.5 to 5 wt % preferably 1 to 3 wt %.

Optionally epoxidized soya bean oil can be added in an amount 1 to 3 wt %, preferably 2 wt % to the polymer to stabilize the polymer against color degradation.

In a preferred embodiment the process is carried out in an extruder. The polyethylene or the polyethylene/peroxide blend is introduced into the extruder and the scorch inhibitor having a melting point below 50° C. or the scorch inhibitor and the peroxide is added, for example, through a side feed to said extruder, optionally after being filtered.

The extrudate is then crosslinked by exposing it to a temperature greater than the decomposition temperature of which the organic peroxide decomposes. The extrusion can be done around one or more electrical conductors to form a medium voltage or high voltage cable. The conductor is either a bare conductor or the conductor is surrounded by primary insulation and/or semicon layer. The cable is then exposed to crosslinking temperatures.

The crosslinking may be carried out in any conventional fashion such as in an oven or in a continuous vulcanization tube, optionally, but not necessarily under nitrogen atmosphere and increased pressure.

The stabilized composition is suitable for use as cable insulation of medium and high voltage power cables. A range for medium voltage is 1 kV to 40 kV. "High voltage" relates to a valve voltage exceeding about 40 kV, especially 40–1101 kV.

Advantages of the invention is a surprisingly high resistance to scorch at extrusion temperature while maintaining a satisfactory crosslinking speed and crosslinking density. The mechanical properties before and after heat aging meet the industrial standard requirements.

The following examples illustrate the invention in detail.

Compound preparation

A low density polyethylene (d=0.923 g/cm$^3$), type Escorene LD 100 MED from Exxon Mobil Chemical, is heated up to 90° C. in a static oven. The stabilizer and the peroxide are heated up to 70° C. by exposure to a water bath. The clear stabilizer/peroxide melt is added to the warm polymer granulate and kept in the oven for approximately 60min. Every ten minutes the mixture is quickly removed and thoroughly shaken. The procedure is repeated until the whole liquid phase was soaked into the polymer.

Examples of laboratory results:

Scorch resistance

In order to simulate cable extrusion conditions, 43 g of each compound are weighed and stir melted at 30 rpm in a lab kneader, type Brabender Plasticorder 814 300, at an initial mass temperature of 120°C. The material is kneaded under a constant load of 2.0 kg until the minimum torque is obtained and a subsequent remarkable increase in torque could be observed. The scorch time is determined as the period between minimum torque and an increase by 1 Nm starting from the minimum torque. A longer scorch time means fewer problems occur due to premature crosslinking during extrusion. Tab. 1 shows the results.

Crosslinking procedure

The production of crosslinked PE-LD plaques (thickness: 1.5 mm) is carried out in three compression molders at different temperatures: In the first mold a defined weight of material is spread out in a frame and heated up to 120° C. for six minutes. During that time the pressure is increased stepwise from 0 to 150 bar. In the next step the frame with the plaques is transferred to a second compression molder and left at 180° C. for 15 min for completion of crosslinking. Finally, the plaques are cooled down from 180° C. to room temperature within ten minutes.

Crosslinking Seed in the Rheometer 5 g of each sample are heated up to 180° C. in a Moving Die Rheometer (Monsanto MDR 2000). At test temperature the samples are exposed to a periodical alternating stress at constant amplitude (3° torsion at 1.66 Hz) until the maximum torque is obtained. The criterion is the constant crosslinking speed, which is a measure of the interaction between crosslinking agent and antioxidant.

TABLE 1

| Product | Loading | Scorch Time | Cure Efficiency Index | Maximum Torque |
|---|---|---|---|---|
| Comparative | 0.20% | 7.2 min | 0.34 dNm | 2.8 dNm |
| Invention A | 0.20% | 11.1 min | 0.25 dNm | 2.6 dNm |
| Invention A | 0.25% | 17.3 min | 0.26 dNm | 2.1 dNm |
| Invention A | 0.30% | 19.1 min | 0.29 dNm | 2.0 dNm |
| Invention B | 0.20% | 9.4 min | 0.31 dNm | 3.1 dNm |
| Invention B | 0.25% | 10.4 min | 0.28 dNm | 2.9 dNm |
| Invention B | 0.30% | 13.1 min | 0.27 dNm | 2.7 dNm |

Comparative = 4,4'-thiobis(2-methyl-6-tert.-butylphenol)
Invention A = 2,4-bis(n-octylthiomethyl)-6-methylphenol
Invention B = mixture of 80 wt % 4,4'-di-tert.-octyldiphenylamine and 20% of Phenol P.

Gel Content

The amount of insolubles is generally a measure of the degree of crosslinking obtained. A defined weight of the crosslinked plaques is exposed to a solvent (toluene, xylene or decaline) at 90° C. for 24 h. The soluble parts are filtered through a sieve and both sieve and sample are washed with the corresponding solvent. Afterwards both are dried in a vacuum dryer until a constant weight is obtained.

The Gel content was determined according to the formula:

$$\text{Gel content (\%)}=100\ (W_1-W_2)/W_3$$

$W_1$=Weight of Sieve and insolubles after vacuum drying $W_2$=Weight of the annealed, empty sieve before filtration $W_3$=Weight of the polymer sample All results (Table 2) are in the typical range expected for this kind of application.

TABLE 2

| Product | Loading | Gel content (Xylene) | Gel content (Decaline) |
|---|---|---|---|
| Comparative | 0.20% | 89.3% | 90.9% |
| Invention A | 0.20% | 89.8% | 91.7% |
| Invention A | 0.25% | 88.5% | 90.5% |
| Invention A | 0.30% | 87.6% | 89.6% |
| Invention B | 0.20% | 91.0% | 92.2% |
| Invention B | 0.25% | 89.8% | 91.1% |
| Invention B | 0.30% | 88.8% | 90.7% |

Comparative = 4,4'-thiobis(2-methyl-6-tert.-butylphenol)
Invention A = 2,4-bis(n-octylthiomethyl)-6-methylphenol
Invention B = mixture of 80 wt % 4,4'-di-tert.-octyldiphenylamine and 20% of Phenol P

Thermal Aging and Mechanical Tests

Tensile bars (dimensions according to DIN 53-504-82) are punched from the crosslinked plaques and split into four sets for oven aging at 150° C. for 0, 3, 10 and 14 days. The tensile bars are evaluated for retention of tensile strength and elongation (yield; break). All results (Tables 3 and 4) are within the standard range of results expected for this application.

TABLE 3

| Product | Loading | Tensile Strength after crosslinking | Retained Tensile Strength after thermal aging at 150° C./10 days | Retained Tensile Strength after thermal aging at 150° C./14 days |
|---|---|---|---|---|
| Comparative | 0.20% | 21.7 MPa | 18.9 MPa | 17.5 MPa |
| Invention A | 0.20% | 20.5 MPa | 17.1 MPa | 17.6 MPa |
| Invention A | 0.25% | 20.7 MPa | 18.1 MPa | 18.8 MPa |
| Invention A | 0.30% | 21.9 MPa | 20.0 MPa | 18.9 MPa |
| Invention B | 0.20% | 21.2 MPa | 17.6 MPa | 16.5 MPa |
| Invention B | 0.25% | 20.4 MPa | 18.0 MPa | 19.2 MPa |
| Invention B | 0.30% | 19.9 MPa | 18.2 MPa | 17.6 MPa |

TABLE 4

| Product | Loading | Elongation after cross-linking | Retained Elongation after thermal aging at 150° C./10 days | Retained Elongation after thermal aging at 150° C./14 days |
|---|---|---|---|---|
| Comparative | 0.20% | 478% | 486% | 479% |
| Invention A | 0.20% | 457% | 461% | 466% |
| Invention A | 0.25% | 465% | 474% | 485% |
| Invention A | 0.30% | 486% | 499% | 494% |
| Invention B | 0.20% | 475% | 461% | 459% |
| Invention B | 0.25% | 470% | 470% | 485% |
| Invention B | 0.30% | 458% | 476% | 471% |

Comparative = 4,4'-thiobis(2-methyl-6-tert.-butylphenol)
Invention A = 2,4-bis(n-octylthiomethyl)-6-methylphenol
Invention B = mixture of 80 wt % 4,4'-di-tert.-octyldiphenylamine and 20% of Phenol P.

Reduced Exudation of Stabilizers

It is examined how the liquid systems behave in comparison to the solid ones. A high tendency for migration of stabilizers to the polymer surface can cause various problems, such as loss of active radical scavengers and a sticky surface lumping together the granules during storage. Exudation of stabilizers and peroxides is also known to have a negative impact on the extrusion process and the cable product and exudation dust may foul filters and cause slippage and instability in the extrusion process.

The example compares the sweat out or exudation behavior of the different systems after conditioning at 55°C. Both Invention A and Invention B show an impressive improvement in terms of compatibility with the polymer. This offers a further opportunity for the converter to increase the additive loadings if appropriate, especially where higher scorch resistance is desired, without expecting severs: problems with exudation.

Each formulation is kept in the oven at 55° C. in order to simulate antioxidant plate out. At the appropriate recall interval, an aliquot is extracted from the oven and measured for surface exudation. The samples are washed with methylene chloride (about 15 seconds contact with polymer) and the solution is then transferred to a round bottom flask and evaporated to dryness. The resultant residue is reconstituted with a standard solution and analyzed quantitatively via liquid chromatography.

TABLE 5

| Product | Loading | Exudated Stabilizer in parts per million after 7 days |
|---|---|---|
| Comparative | 0.20% | 1430 |
| Invention A | 0.20% | 30 |

TABLE 5-continued

| Product | Loading | Exudated Stabilizer in parts per million after 7 days |
|---|---|---|
| Invention A | 0.25% | 40 |
| Invention A | 0.30% | 50 |
| Invention B | 0.20% | 50 |
| Invention B | 0.25% | 60 |
| Invention B | 0.30% | 80 |

Comparative = 4,4'-thiobis(6-t-butyl-3-methylphenol)
Invention A = 2,4-bis(n-octylthiomethyl)-6-methylphenol
Invention B = mixture of 80 wt % 4,4'-di-tert.-octyldiphenylamine and 20% of Phenol P.

A further preferred embodiment of the present invention relates to the use of the scorch inhibitor as described above to prevent blooming (sweat out or exudation) from the substrate.

The invention claimed is:

1. A polyethylene composition having improved scorch resistance consisting essentially of (a) a polyethylene (b) a scorch inhibitor having a melting point below 50° C. at atmospheric pressure and is a compound of the formula I

I

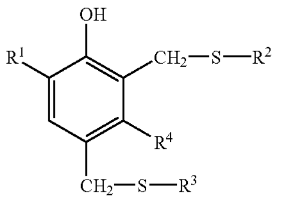

wherein $R^1$ is $C_{1-20}$ alkyl or $C_{1-20}$alkyl which is substituted by phenyl, $C_{2-20}$alkenyl, $C_{3-20}$alkynyl, $C_{5-9}$cycloalkyl, phenyl or tolyl;

$R^2$ and $R^3$ each independently of the other are $C_{1-20}$alkyl; $C_{1-20}$alkyl substituted by phenyl, cyano, formyl, acetyl, one or two hydroxyl groups, by a group —O—$COR^5$ wherein $R^5$ is $C_{1-20}$alkyl; $C_{2-20}$alkenyl; $C_{3-20}$alkynyl; $C_{5-7}$cycloalkyl; $C_{5-7}$cycloalkyl substituted by hydroxyl; phenyl; 4-chlorophenyl; 2-methoxycarbonylphenyl; p-tolyl; 1,3-benzthiazol-2-yl or a group $-(CHR^6)_nCOOR^7$ or $-(CHR^6)_n CONR^8R^9$ wherein n is 1 or 2, $R^6$ is hydrogen or $C_{1-6}$alkyl, $R^7$ is $C_{1-20}$alkyl, $C_{1-20}$alkyl which is interrupted by one to five O or S, $C_{5-7}$cycloalkyl, phenyl, benzyl or tolyl, $R^8$ and $R^9$ are hydrogen or $C_{1-6}$alkyl;

$R^4$ is hydrogen or methyl and (c) an organic peroxide; which composition can be extruded with a minimum of premature crosslinking yet possess a sufficient crosslinking speed.

2. A composition according to claim 1, wherein $R^1$ is $C_{1-20}$alkyl, and $R^2$ and $R^3$ are identical and are $C_{1-20}$alkyl or $C_{1-20}$alky substituted by one or two hydroxyl.

3. A composition according to claim 1, wherein the scorch inhibitor of formula I is 2,4-bis(n-octylthiomethyl)-6-methylphenol or 2,4-bis(n-dodecylthiomethyl)-6-methylphenol.

4. A composition according to claim 1, wherein the amount of scorch inhibitor is in the range from 0.01 to 1 wt % and the amount of the peroxide is in the range from 0.5 to 5 wt %.

5. A polyethylene composition having improved scorch resistance comprising (a) a polyethylene (b) a scorch inhibitor having a melting point below 50° C. at atmospheric pressure and is a compound of the formula I

I

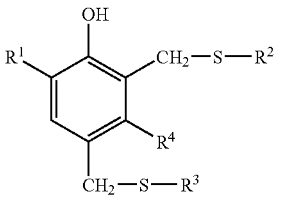

wherein $R^1$ is $C_{1-20}$ alkyl or $C_{1-20}$alkyl which is substituted by phenyl, $C_{2-20}$alkenyl, $C_{3-20}$alkyl, $C_{5-9}$cycloalkyl, phenyl or tolyl;

$R^2$ and $R^3$ each independently of the other are $C_{1-20}$alkyl; $C_{1-20}$alkyl substituted by phenyl, cyano, formyl, acetyl, one or two hydroxyl groups, by a group —O—$COR^5$ wherein $R^5$ is $C_{1-20}$alkyl; $C_{2-20}$alkenyl; $C_{3-20}$alkynyl; $C_{5-7}$cycloalkyl; $C_{5-7}$cycloalkyl substituted by hydroxyl; phenyl; 4-chlorophenyl ; 2-methoxycarbonylphenyl; p-tolyl; 1,3-benzthiazol-2-yl or a group $-(CHR^6)_nCOOR^7$ or $-(CHR^6)_n CONR^8R^9$ wherein n is 1 or 2, $R^6$ is hydrogen or $C_{1-6}$alkyl, $R^7$ is $C_{1-20}$alkyl, $C_{1-20}$alkyl which is interrupted by one to five O or S, $C_{5-7}$cycloalkyl, phenyl, benzyl or tolyl, $R^8$ and $R^9$ are hydrogen or $C_{1-6}$alkyl; $R^4$ is hydrogen or methyl (c) an organic peroxide and (d) an amine selected from the group consisting of diphenylamine, 4-tert-butyldiphenylamine, 4-tert-octyldiphenylamine, 4,4'-di-tert-butyldiphenylamine, 2,4,4'-tris-tert-butyldiphenylamine, 4-tert-butyl-4'-tert-octyldiphenylamine, o,o'-, m,m'- or p,p'-di-tert-octyldiphenylamine, 2,4-di-tert-butyl-4'-tert-octyldiphenylamine, 4,4'-di-tert-octyldiphenylamine, and 2,4-di-tert-octyl-4'-tert-butyldiphenylamine, which composition can be extruded with a minimum of premature crosslinking yet possess a sufficient crosslinking speed.

6. A composition according to claim 5, wherein the amine is 4,4'-di-tert-octyldiphenylamine or Amine (A) which is a mixture of: 3 wt % diphenylamine, 14 wt % 4-tert-butyldiphenylamine, 30 wt % (4-tert-octyldiphenylamine, 4,4'-di-tert-butyldiphenylamine and 2,4,4'-tris-tert-butyldiphenylamine), 29 wt % (4-tert.-butyl-4'-tert-octyldiphenylamine, o,o', m,m' or p,p'-di-tert-octyldiphenylamine and 2,4-di-tert-butyl-4'-tert-octyldiphenylamine), 18 wt % 4,4'-di-tert-octyldiphenylamine and 6 wt % 2,4-di-tert-octyl-4'-tert-butyldiphenylamine.

7. A process for preparing a crosslinked polyethylene composition whereby a polyethylene/peroxide blend is introduced into an extruder and a scorch inhibitor having a melting point below 50° C. at atmospheric pressure and which is a compound of the formula I

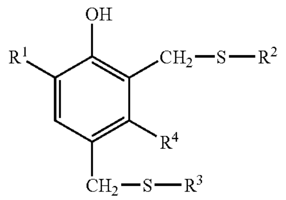

I wherein $R^1$ is $C_{1-20}$ alkyl or $C_{1-20}$alkyl which is substituted by phenyl, $C_{2-20}$alkenyl, $C_{3-20}$alkyl, $C_{5-9}$cycloalkyl, phenyl or tolyl;

$R^2$ and $R^3$ each independently of the other are $C_{1-20}$alkyl; $C_{1-20}$alkyl substituted by phenyl, cyano, formyl, acetyl, one or two hydroxyl groups, by a group —O—$COR^5$ wherein $R^5$ is $C_{1-20}$alkyl; $C_{2-20}$alkenyl; $C_{3-20}$alkynyl; $C_{5-7}$cycloalkyl; $C_{5-7}$cycloalkyl which is substituted by hydroxyl; phenyl; 4-chlorophenyl ; 2-methoxycarbonylphenyl; p-tolyl; 1,3-benzthiazol-2-yl or a group $-(CHR^6)_nCOOR^7$ or $-(CHR^6)_nCONR^8R^9$ wherein n is 1 or 2, $R^6$ is hydrogen or $C_{1-6}$alkyl, $R^7$ is $C_{1-20}$alkyl, $C_{1-20}$alkyl which is interrupted by one to five O or S, $C_{5-7}$cycloalkyl, phenyl, benzyl or tolyl, $R^8$ and $R^9$ are hydrogen or $C_{1-6}$alkyl; $R^4$ is hydrogen or methyl is added to said extruder, or polyethylene is introduced into an extruder and the scorch inhibitor and the peroxide is added to said extruder, and whereby the extrudate is then crosslinked by exposing it to a temperature greater than the decomposition temperature of which the organic peroxide decomposes.

* * * * *